(12) United States Patent
Brei et al.

(10) Patent No.: US 11,590,746 B2
(45) Date of Patent: Feb. 28, 2023

(54) ELIMINATION OF SURFACING FILM AND PRIMER FROM COMPOSITE SUBSTRATES

(71) Applicant: The Boeing Company, Arlington, VA (US)

(72) Inventors: Mark R. Brei, Ladson, SC (US); Kevin D. Gordon, Summerville, SC (US); Kjersta Larson-Smith, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 649 days.

(21) Appl. No.: 16/515,225

(22) Filed: Jul. 18, 2019

(65) Prior Publication Data

US 2021/0016553 A1    Jan. 21, 2021

(51) Int. Cl.
  *B32B 17/04*    (2006.01)
  *B32B 27/38*    (2006.01)
  (Continued)

(52) U.S. Cl.
  CPC .............. *B32B 27/38* (2013.01); *B32B 5/024* (2013.01); *B32B 17/04* (2013.01); *B32B 27/08* (2013.01);
  (Continued)

(58) Field of Classification Search
  CPC ....... B32B 17/04; B32B 1/00; B32B 2250/03; B32B 2250/04; B32B 2250/05; B32B 2250/40; B32B 2250/42; B32B 2255/10; B32B 2255/26; B32B 2260/021; B32B 2260/046; B32B 2262/0269; B32B 2262/10; B32B 2262/101; B32B 2262/106; B32B 2262/14; B32B 2305/08; B32B 2305/188; B32B 2305/72; B32B 2307/206; B32B 2307/71; B32B 2307/714; B32B 2307/718; B32B 2363/00; B32B 2375/00; B32B 2377/00; B32B 2605/12; B32B 2605/18; B32B 27/08; B32B 27/12; B32B 27/18; B32B 27/20; B32B 27/26; B32B 27/38; B32B 27/40; B32B 5/02; B32B 5/024; B32B 5/028; C08J 2363/00; C08J 2475/04; C08J 5/0405; C08J 5/042;
  (Continued)

(56) References Cited

U.S. PATENT DOCUMENTS

| | | |
|---|---|---|
| 6,607,358 B2 | 8/2003 | Finn et al. |
| 2010/0151186 A1 | 6/2010 | Hebert |

(Continued)

OTHER PUBLICATIONS

Cytec Engineering Materials, "Meltbond 1515-3 Film Adhesive Data Sheet", 2010, pp. 1-6, retrieved from the internet https://www.e-aircraftsupply.com/MSDS/103222cytec%20Meltbond%201515-3%20tds.pdf.

(Continued)

*Primary Examiner* — Lawrence D Ferguson
(74) *Attorney, Agent, or Firm* — Coats & Bennett, PLLC (57) ABSTRACT

Co-curable epoxy-based composite materials coated with co-curable polyurethane-based coating materials to form co-curable and co-cured polyurethane coated epoxy-based composite materials, with the polyurethane-based coating materials comprising UV-stabilizer agents and cure control agents are disclosed, along with components and large structures comprising the co-cured materials.

20 Claims, 7 Drawing Sheets

(51) Int. Cl.
  *B32B 5/02* (2006.01)
  *B32B 27/08* (2006.01)
  *B32B 27/12* (2006.01)
  *B32B 27/20* (2006.01)
  *B32B 27/26* (2006.01)
  *B32B 27/40* (2006.01)
  *C08J 5/04* (2006.01)
  *C08J 9/00* (2006.01)
  *C08J 7/04* (2020.01)

(52) U.S. Cl.
  CPC .............. *B32B 27/12* (2013.01); *B32B 27/20* (2013.01); *B32B 27/26* (2013.01); *B32B 27/40* (2013.01); *C08J 5/042* (2013.01); *C08J 5/043* (2013.01); *C08J 5/0405* (2021.05); *C08J 5/046* (2013.01); *C08J 5/047* (2013.01); *C08J 7/04* (2013.01); *C08J 9/0085* (2013.01); *B32B 2250/03* (2013.01); *B32B 2250/04* (2013.01); *B32B 2250/05* (2013.01); *B32B 2250/40* (2013.01); *B32B 2250/42* (2013.01); *B32B 2305/08* (2013.01); *B32B 2305/188* (2013.01); *B32B 2305/72* (2013.01); *B32B 2307/71* (2013.01); *B32B 2363/00* (2013.01); *B32B 2375/00* (2013.01); *B32B 2377/00* (2013.01); *B32B 2605/12* (2013.01); *B32B 2605/18* (2013.01); *C08J 2363/00* (2013.01); *C08J 2475/04* (2013.01)

(58) Field of Classification Search
  CPC ... C08J 5/043; C08J 5/046; C08J 5/047; C08J 7/04; C08J 9/0085
  See application file for complete search history.

(56) References Cited

U.S. PATENT DOCUMENTS

2010/0151239 A1* 6/2010 Hebert ................. B32B 7/12
  156/60
2011/0014356 A1 1/2011 Fornes et al.
2014/0294594 A1 10/2014 Spoonire et al.
2018/0194922 A1 7/2018 Marx

OTHER PUBLICATIONS

Heatcon, "HCS2402-050—CYTEC Carbon Fiber Prepreg 934 PWC T300 UT," 2021, pp. 1-7, retrieved from the internet https:/www.heatcon.com/product/hcs2402-050-prepreg/.

PPG Aerospace, Despothane HS CA8000 Polyurethane Topcoats (US) Technical Data Sheet, 2021, pp. 1-8, retrieved from the internet http://ppgaerospace.com.getmedia/c1eb40cb-143e-4e71-990f-181e49f15569/CA8000-US-TDS.pdf?ext=pdf.

Heatcon, "HCS2404-050—CYTEC Adhesive Film 1515-4", 2021, pp. 1-7, retrieved from the internet https://www.heatcon.com/products/hcs2404-050-film/.

* cited by examiner

ELIMINATION OF SURFACING FILM AND PRIMER FROM COMPOSITE SUBSTRATES

TECHNOLOGICAL FIELD

The present disclosure relates generally to the field of material surface preparation to facilitate further the addition of material layers. More specifically the present disclosure relates to the field of material surface preparation to counter UV degradation of composite material parts and components.

BACKGROUND

The use of composite materials in the manufacture of various structures continues to increase. At least due to their strength versus weight ratio, composite materials offer advantages as replacement materials for denser materials such as, for example, metals, metal alloys, etc., for example, where the overall weight of a completed structure (or the weight of a component of a completed structure) is a consideration in the selection of materials used in the manufacture of such a completed structure (or in the manufacture of a component of a completed structure).

Composite materials are often layered into laminates that have a number of composite material layers, often called "prepregs". Prepregs are "pre-impregnated" composite fibers where a matrix material, such as an epoxy resin-containing material, is already present. The fibers often take the form of a weave and the matrix is used to bond them together and to other components during manufacture. The composite matrix material is typically partially cured to allow easy handling. Such composite matrix material may require cool or cold storage to prevent further partial curing, or complete curing, and such composite matrix material is referred to as B-Stage material. Consequently, B-Stage prepregs are stored in cooled areas, as ambient heat can accelerate complete polymerization. Prepregs also allow one to impregnate a bulk amount of fiber and then store the prepreg in a cooled area for an extended time until a later cure. Prepregs are typically formed on a flat workable surface. Stacks of prepreg plies are then formed and, if desired, can be shaped into a desired shape using shaping or forming tools, also called mandrels.

Composite materials are typically post-processed or "reworked" to further imbue the composite materials and/or the composite material surfaces, with desired properties, or to protect the composite material and/or the composite material surfaces. For example, primers and paint coatings that include a UV mitigation or a UV "blocking" agent can be applied to a composite material surface for the purpose of protecting a composite material surface from oxidation and/or discoloration that can be caused, for example, by exposing the composite material to ultraviolet (UV) radiation during the use of the composite material as a construction material in the manufacture of, for example, a larger structure.

Material layers that can be deposited as, for example, coatings may be added to a composite material surface for the purpose of changing the characteristics of a composite material. For example, primers or other coating layers can be added to a composite material to improve adhesion of subsequent coating layers such as, for example, paints, sealants, etc., to a composite material surface that may already have one or more other coatings applied The layering of coating materials onto composite material surfaces is labor intensive, time-consuming and can add substantial weight to large objects and large structures that include such composite materials having multiple coating layers.

In addition, one or more of the composite material coating layers can each require separate surfacing preparation steps and procedures prior to the subsequent deposition of one or more coating layers onto composite material surfaces. In some instances, a portion of one or more previously deposited coating must be removed, or otherwise reworked, before adding further coating layers. Such intermediate reworking of composite material surfaces during the treatment of composite material surfaces is also labor-intensive, time-consuming, and costly.

SUMMARY

According to a present aspect, a coated co-curable and co-cured epoxy-based composite material is disclosed, with the coated co-curable and co-cured epoxy-based composite material including a co-curable epoxy-based composite material, and at least one layer of a co-curable and co-cured polyurethane-based coating material layer configured to be disposed onto the co-curable epoxy-based composite material to form the coated co-curable and co-cured epoxy-based composite material. The co-curable polyurethane-based coating material layer includes a UV stabilizing agent and curing control agent, and the UV stabilizing agent and the curing control agent are incorporated into the co-curable polyurethane-based coating material layer.

In another aspect, the co-curable epoxy-based composite material includes fiber-containing epoxy resin-based composite materials including, for example, carbon fiber-reinforced plastics (CFRPs).

In another aspect, the co-curable epoxy-based composite material is configured to co-cure with the co-curable polyurethane-based coating material layer and form a co-cured polyethylene-based coating material-coated epoxy-based composite material, with both materials co-curing at a temperature ranging from about 250° F. to about 370° F.

The disclosed method further includes exposing the co-curable polyurethane-based coating material-coated epoxy-based composite material to a co-curing regimen, and co-curing the co-curable polyurethane-based coating layer and the co-curable epoxy resin-based composite material according to a co-curing regimen to form a co-cured polyurethane-based coating material-coated epoxy-based composite material, with the co-curing regimen comprising a co-curing temperature not to exceed 400° F.

In another aspect, the co-curable polyurethane-based coating material-coated co-curable epoxy-based composite material further includes at least one tack layer configured to be in contact with the co-curable polyurethane-based coating layer.

In another aspect, the co-curable polyurethane-based coating material-coated epoxy-based composite material further includes at least one scrim layer disposed onto at least one layer of co-curable polyurethane-based coating layer.

In another aspect, the co-curable polyurethane-based coating material-coated epoxy-based composite material does not comprise an intervening surfacing film layer between the co-curable or co-cured polyurethane-based coating material layer and the co-curable or co-cured epoxy-based composite material.

In a further aspect, the polyurethane-coated co-curable epoxy-based composite material does not comprise an additional primer layer between the co-curable or co-cured polyurethane-based coating material layer and a strippable intermediate coating layer.

In another aspect, the co-cured polyurethane-based coating material layer has an electrical resistance value of at least about 1000 kΩ.

In another aspect, the co-curable polyurethane-based coating material layer comprises a UV transmissivity value of 0% transmittance in the UV visible wavelength range of 200 to 800 nm when the co-cured polyurethane-based coating material has an average thickness ranging from about 2 mils to about 3 mils.

In another aspect, the co-curable polyurethane-based coating material layer comprises a UV transmissivity value of 0% transmittance in the UV visible wavelength range of 200 to 800 nm when the co-cured polyurethane-based coating material has an average thickness greater than about 2 mils.

According to a further aspect, a method of forming a polyurethane-based coating material-coated co-curable epoxy-based composite material is disclosed, with the method including applying a co-curable polyurethane-based coating material layer directly to a co-curable epoxy-based composite material to form the co-curable polyurethane-based coating material-coated epoxy-based composite material, with the co-curable polyurethane-based coating material layer including a UV stabilizer agent, and a curing control agent, and wherein the UV stabilizing agent and the curing control agent are incorporated into the co-curable polyurethane-based coating layer.

In a further aspect, in the step of applying the polyurethane-based coating layer directly to the co-curable epoxy-based composite material, the co-curable polyurethane-based coating material layer is applied as a film to the epoxy-based composite material.

In another aspect, at least one scrim layer is applied onto at least one of the co-curable polyurethane-based coating layer and a co-curable epoxy-based composite material.

In another aspect, at least one tack layer is applied onto at least one of the co-curable polyurethane-based coating layer and the co-curable epoxy-based composite material.

According to a further aspect, a method of forming a polyurethane-coated co-cured epoxy-based composite material is disclosed, with the method including providing a polyurethane-based coating material-coated co-curable epoxy-based composite material, with the co-curable epoxy-based composite material including a co-curable epoxy-based composite material, and at least one layer of a co-curable polyurethane-based coating material layer disposed onto the co-curable epoxy-based composite material to form the polyurethane-based coating material-coated co-curable epoxy-based composite material. The co-curable polyurethane-based coating layer includes a UV stabilizer agent and a curing control agent, with the UV stabilizer agent and the curing control agent incorporated into the co-curable polyurethane-based coating material layer.

The disclosed method further includes exposing the co-curable polyurethane-based coating material-coated epoxy-based composite material to a co-curing regimen, and co-curing the co-curable polyurethane-based coating layer and the co-curable epoxy resin-based composite material according to the co-curing regimen to form a co-cured polyurethane-based coating material-coated epoxy-based composite material, with the co-curing regimen comprising a co-curing temperature ranging from about 250° F. to about 370° F.

The disclosed method further includes exposing the co-curable polyurethane-based coating material-coated epoxy-based composite material to a co-curing regimen, and co-curing the co-curable polyurethane-based coating layer and the co-curable epoxy resin-based composite material according to the co-curing regimen to form a co-cured polyurethane-based coating material-coated epoxy-based composite material, with the co-curing regimen comprising a co-curing temperature not to exceed 400° F.

A further aspect discloses a component comprising the presently disclosed co-curable epoxy-based composite material coated with the co-curable polyurethane-based coating material, and larger structures comprising such component.

A further aspect discloses a component comprising the presently disclosed co-cured epoxy-based composite material coated with the co-cured polyurethane-based coating material, and larger structures comprising such component.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

According to presently disclosed aspects, a co-curable polyurethane-based coating that includes a UV-inhibiting agent and a curing control agent can be used to form a co-curable polyurethane-based coating that is used to coat a co-curable epoxy-based material including, for example, a co-curable epoxy-based composite material for the purpose of, in a single coating layer, imparting to the co-curable epoxy-based material enhanced UV protection; and enhanced resistivity to chemical degradation caused, for example, by paint stripping agents and paint rework procedures.

If desired, the presently disclosed co-curable polyurethane-based coating material can be made into, for example, a co-curable polyurethane-based coating film that can be applied with precision and ease onto co-curable epoxy-based composite materials, for example, for the purpose of enhancing coating material uniformity. In other words, according to present aspects, the presently disclosed co-curable polyurethane-based coating material including a co-curable polyurethane-based coating material that can be made into the form of a coating film can possess a substantially constant average coating thickness that can be preselected, and better controlled along its applied area, than can, for example, a liquid coating or paint that is brushed, sprayed, or into which a component or part is dipped, etc.

The co-curable polyurethane-based coatings and coating materials, including film coatings, according to present aspects, can be manufactured and stored in rolls for later use, and dispensed, for example, from a rolled or other desired orientation to facilitate storage, dispensing, use, etc., (as compared to, for example, a sprayed liquid paint or other sprayed coating material) thereby increasing uniformity, accuracy, ease of handling, ease of application, etc., and reducing the overall weight of a final co-cured polyurethane-coated epoxy-based composite material (and reducing the overall weight of components comprising the co-cured polyurethane-coated epoxy-based composite material).

In addition, the disclosed co-cured polyurethane-based coatings can have an electrical resistivity greater than 1000 kΩ, or the co-curable polyurethane-based coatings can be doped with conductive material to achieve a desired and predetermined electrical resistivity (or electrical conductivity, etc.).

In addition, the presently disclosed co-curable polyurethane-based coatings display an adhesion capability to facilitate the bonding of topcoats, sealants, etc. to the co-cured polyurethane-based coating material and coating material films.

According to present aspects, the use of a tailored, co-curable polyurethane-based material coating to coat a co-curable epoxy-based composite material obviates the need for several separate coating layers applied to treat an epoxy-based composite material. According to present aspects, the co-curable polyurethane-based material coating can be a single layer coating. According to further aspects, the co-curable epoxy-based composite material includes at least one of a carbon fiber-reinforced epoxy material, a glass fiber-reinforced epoxy material, a boron fiber-reinforced epoxy material, an aramid fiber-reinforced epoxy material, other high strength epoxy materials, and combinations thereof.

During the fabrication of composite parts, including epoxy-based composite parts, epoxy-based composite material surfaces can begin to oxidize at the composite material surface, for example, due to exposure to ambient ultraviolet (UV) radiation. To avoid a change in surface characteristic of a composite material that can be caused, at least in part by composite material exposure to UV radiation, epoxy-based composite material surfaces are often coated with a primer layer, with the primer containing, for example, a UV "blocking" agent. However, applying UV mitigation, or "blocking" agents to composite surfaces often adds manufacturing complexity in the form of, at least, increasing manufacturing time, increasing rework time, increasing overall production cost, increasing overall weight of a coated component, assembly, sub-assembly, and object comprising such component, assembly, sub-assembly, etc. Further, such applied UV blocking material layers typically are removed from the composite material before additional composite material processing is conducted, requiring additional manufacturing steps. In addition, such primer layers are often treated to further accommodate a subsequent paint layer or topcoat. This treatment of individual subsequent layers added to an epoxy-based composite material also leads to increased manufacturing time, increased rework time, increased overall production cost, increased overall weight, etc.

Since epoxy-based composite substrate materials often "outlive" or "outlast the protective coatings and paint that is applied onto the composite material as a "paint stack", existing paint stacks, or portions of paint stacks, (e.g. base coat, sealant, topcoat, clear coat, and at least a portion of an underlying surfacing films, etc.) are removed and re-applied, or otherwise reworked. Further, if surfacing films and/or epoxy-based composite materials sustain UV damage, without appropriate rework of these surfaces, paint adhesion of subsequently applied paint layers can be adversely affected. This issue typically has been addressed by depositing yet another layer of spray surfacer to protect underlying layers in a paint stack from UV degradation. The addition of another layer of spray surfacer adds more weight to the object comprising the paint stack, and results in additional processing time, rework time, etc., and adds to overall cost in terms of, for example, additional resources in terms of material, manpower hours, time out-of-service, etc. Further, the additional stripping conducted by, for example, a human operator, can increase ergonomic concerns on a workforce.

Figure 1:
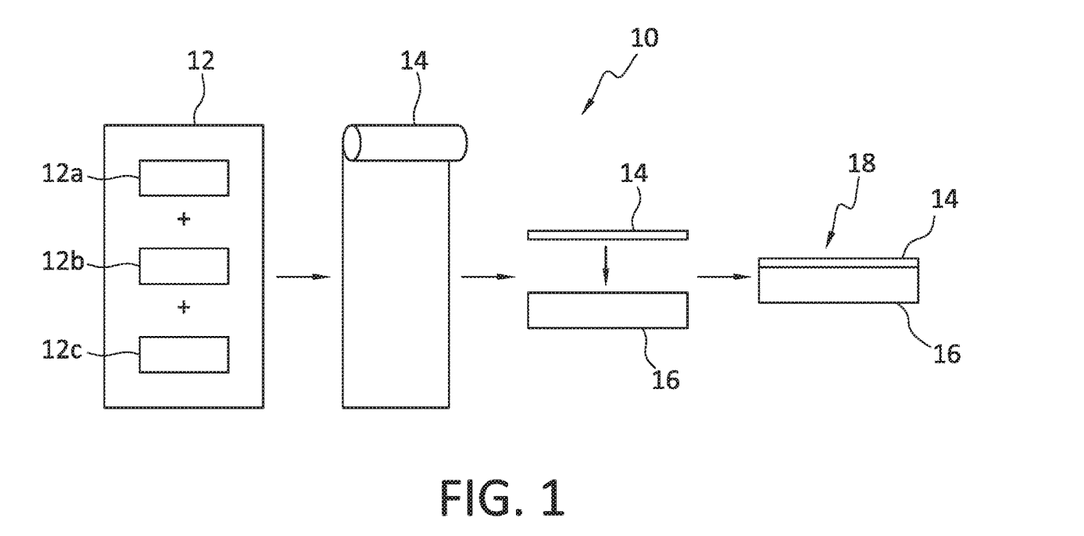
FIG. 1 is an illustration of a system of forming a co-curable and co-cured polyurethane-based coating material-coated epoxy-based composite material according to a present aspect.

According to present aspects, FIG. 1 illustrates a system for making a co-curable and co-cured polyurethane-coated epoxy-based composite material. As shown in FIG. 1, a co-curing system 10 includes a co-curable polyurethane-based coating material 12 that is formed into a co-curable polyurethane-based coating film 14 that is shown as dispensed from a rolled form. That is, according to present aspects, and although not shown in FIG. 1, a co-curable polyurethane-based coating film 14 can be made, for example, by applying a layer of the co-curable polyurethane-based coating material layer to a substrate, allowing the film to dry, followed by rolling the film such that the resulting film can be rolled upon itself into, for example, a film roll. Co-curing system 10 further shows a portion of the co-curable polyurethane-based coating film 14 oriented proximate to co-curable epoxy-based composite material 16. According to co-curing system 10, the co-curable polyurethane-based coating film 14 is then brought into contact or otherwise disposed to a surface of the co-curable epoxy-based composite material 16 to coat the co-curable epoxy-based composite material 16, and to form a co-curable polyurethane-coated epoxy-based composite material 18 (equivalently referred to herein as the "co-curable coated composite material 18").

According to present aspects, a "co-curable" material is defined as a material that can be cured with another material such that the two co-curable materials will cure when exposed to common curing conditions, such as those that can be imposed by a predetermined curing regimen (predetermined temperature, pressure, ramp up temperatures/rates, dwell periods, etc.) to form a "co-cured" composition. The co-curable polyurethane-coated epoxy-based composite material is referred to equivalently here as the "co-cured coated composite material".

As further shown in FIG. 1, the co-curable polyurethane-based coating material layer 12 comprises a polyurethane material 12a that is combined or otherwise mixed with a UV stabilizer agent 12b and a cure control agent 12c. According to present aspects, the co-curable polyurethane-based coating material 12 can be custom-formulated for the purpose of providing multiple characteristics to the one co-curable polyurethane coating material that can, even as a single layer coating, promote predetermined co-curing with associated co-curable epoxy-based composite materials, while also providing predetermined and enhanced UV protection and predetermined chemical resistance to paint stripping agents and other chemical agents, at least for the purpose of significantly extending the life of the underlying epoxy-based composite material, or other underlying coatings, and significantly reducing the need for reworking the underlying epoxy-based composite material due to detrimental impact of UV radiation over the useful life of the epoxy-based composite material.

In addition, the polyurethane-based coating material layer 12 is formulated to not only co-cure with the epoxy-based composite material, but to have superior UV wavelength resistance to prevent degradation of the underlying epoxy-based composite material by inhibiting transmittance of UV radiation through the polyurethane layer. According to present aspects, the co-curable polyurethane-based coating material layer achieves a UV transmittance value of 0 mW/cm$^2$, between 200 nm to 800 nm, when the polyurethane-based coating has an average film thickness ranging from about 2 mils to about 3 mils, as measured with an Ocean USB2000+UV-VIS Spectrometer (Ocean Optics, Winter Park, Fla.). According to present aspects, benefits obtained by inhibiting UV degradation of an epoxy-based composite resin include, without limitation, preventing discoloration, prolonging useful life of the composite material, prolonging service intervals, etc.

The UV stabilizer agent 12b can be any UV resistant material that is compatible with the polyurethane material 12a and that will remain in, and not settle out of, the polyurethane material 12a. Such UV stabilizer agents include, without limitation benzotriazole, hindered amine light stabilizers (HALS), carbon black, and titanium dioxide, with the preferred UV stabilizer agents capable of being added to the polyurethane material in solid or liquid form.

The cure control agent 12c is provided to facilitate co-curing of the co-curable polyurethane-based coating material with the co-curable epoxy-based composite material. That is, the cure control agent imparts chemical characteristics to the co-curable polyurethane-based coating material layer to facilitate or otherwise promote co-curing of the co-curable polyurethane-based coating material layer with the epoxy-based composite material at a temperature ranging from about 250° F. to about 370° F., and in a curing regimen where the curing temperature is held to a temperature not to exceed about 400° F., and optionally in the presence of pressures ranging from about 45 psi to about 100 psi.

When used as an interlayer in an epoxy composite material painting or coating regimen, the advantages imparted by the presently disclosed co-curable polyurethane-based coating materials, extend beyond the advantages imparted to the underlying epoxy-based composite material. For example, according to present aspects, through the use of the presently disclosed co-curable polyurethane-based coating, a significant number of procedural steps otherwise and previously typically required during initial substrate painting are obviated, resulting in a substantial reduction in resources including, material cost for obviated layers, manpower hours previously typically required for individual layer application treatment (e.g., individual layer pre-treatment surfacing steps, layer application steps, layer post-treatment surfacing steps, including chemical application, physical surfacing treatments such as, including sanding, etc., inspection of deposited layers, etc.), More specifically, the use of the presently disclosed co-curable polyurethane-based coating material layer in the painting protocols of epoxy-based composite materials, including without limitation, painting or coating epoxy-based composite materials used in vehicle and aircraft manufacture. The use of presently disclosed co-curable polyurethane-coated epoxy-based composite materials, obviates at least the following steps that are otherwise typically required (for painting an epoxy-based composite material) including, for example: initial sanding steps; application of spray surfacing films and agents; application and removal of surface activation chemicals and agents; application of a separate detail primer layer; reactivation of an applied detail primer layer; application of an assembly primer layer; as well as obviating inspection steps typically required in connection with the obviated layer application steps, etc.

According to present aspects, the elimination of the significant number of processing steps afforded to at least: 1) a co-curable and co-cured epoxy-based composite materials coated with the co-curable and co-cured polyurethane-based coatings, and 2) the larger components and structures comprising the co-cured polyurethane-coated epoxy-based composite materials, results in significant savings in terms of materials, manufacturing/production time, rework time, out-of-service time, repainting and re-surfacing time, and overall cost of production, as well as future maintenance cost, etc.

Figure 2:
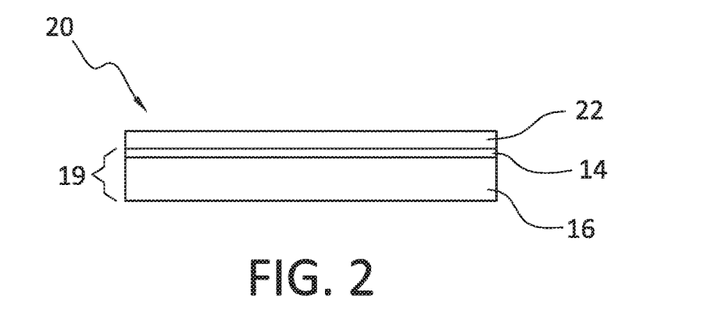
FIG. 2 is an illustration of a co-curable and/or a co-cured epoxy-based composite material according to a present aspect.

As further shown in FIG. 2, the co-curable polyurethane-coated epoxy-based composite material 18 (shown in FIG. 1) can be exposed to or subjected to a curing regimen for the purpose of curing the co-curable polyurethane-coated epoxy-based composite material 18 to form a co-cured polyurethane-coated epoxy-based composite material 19. According to present aspects, the contemplated curing regimen can be hybridized for the purpose of accomplishing co-curing of both the co-curable polyurethane-based coating film 14 component and the co-curable epoxy-based composite material 16 component of the co-curable polyurethane-coated epoxy-based composite material 18. The contemplated temperature of the co-curing regimen required to accomplish the co-curing ranges from about 250° F. to about 370° F., and without exceeding the upper co-curing temperature threshold temperature of 400° F., with required ramp-up temperature periods and dwell times at set temperature and a pressures ranging from about 45 psi to about 110 psi, as would be readily understood.

As shown in FIG. 2, a strippable intermediate coating layer 22 is shown deposited onto or otherwise applied to the co-cured polyurethane-coated epoxy-based composite material 19 to form a co-cured polyurethane-coated epoxy-based composite material with strippable intermediate coating layer 20. The strippable intermediate coating layer 22 can be a selectively strippable layer that assists in the removal of subsequently deposited coating layers (e.g., the coatings and coating layers to be subsequently deposited onto the strippable intermediate coating layer, such as, for example, various topcoat layers, clearcoat layers, etc.) that are collectively and equivalently referred to herein as "paint layers".

Painted objects comprising composite substrate materials can be designed and engineered to have a useful life that "outlasts" decorative or non-decorative paint coating layers applied to the painted composite materials. Accordingly, the strippable intermediate coating layer facilitates the removal of subsequently deposited paint layers by allowing such subsequently deposited paint layers (e.g. basecoat layers and topcoat layers, etc. deposited onto the strippable intermediate coating layer) to be removed or "stripped" from a paint stack, without allowing the stripping chemicals and stripping processes to remove layers beneath the strippable intermediate coating layer.

According to further aspects, the co-cured polyurethane-based coating material layer possesses a chemical resistance that is robust enough to resist chemical attack from chemical paint stripping agents and other stripping processes. In this way, and according to present aspects, the co-cured polyurethane-based coating material not only serves to protect the underlying co-cured epoxy-based composite material from UV degradation by blocking UV radiation, but also protects the underlying co-cured epoxy-based composite material from degradation due to paint stripping procedures as infiltration into the epoxy composite material is prevented by the co-cured polyurethane-based coating material layer.

Figure 3:
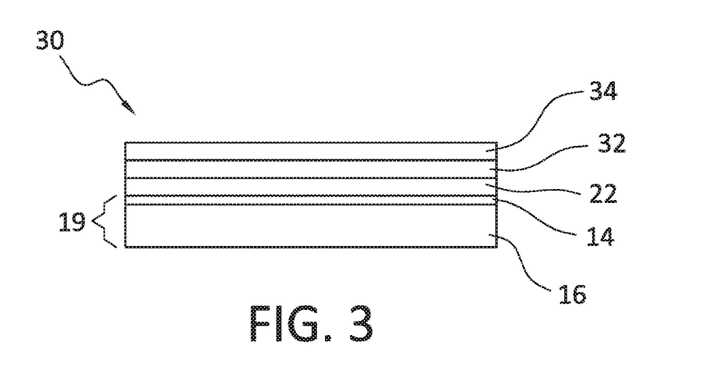
FIG. 3 is an illustration of a co-curable and/or a co-cured epoxy-based composite material further comprising basecoat and topcoat layers according to a present aspect.

According to further aspects, FIG. 3 shows the co-cured polyurethane-coated epoxy-based composite material 19 with strippable intermediate coating layer 22 with an assembly topcoat layer 32 deposited onto the strippable intermediate coating layer 22, and a basecoat layer 34 deposited onto the assembly topcoat layer 32 to form a painted assembly 30 (equivalently referred to herein as a "painted stack"). Painted assembly 30 can be one configuration thought of as a decorative coating that can be applied as, for example, an aircraft livery, etc. Such an aircraft livery can be established, for example on various surfaces of, for example, commercial aircraft, with such surfaces including, for example, fuselage sections, tail sections, etc., as will be described in greater detail in connection with aspects shown in FIG. 8.

As further shown in FIG. 3, during repainting, resurfacing, or other paint-oriented rework, according to present aspects, preferably it is the strippable intermediate coating layer 22, the assembly topcoat layer 32, and the basecoat layer 34 that can be removed from the painted assembly 30, while the co-cured polyurethane-coated epoxy-based composite material 19 remains largely undisturbed by the paint stripping agents and processes.

Figure 4:
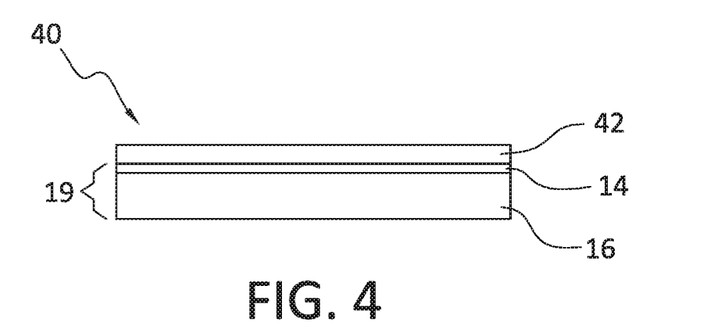
FIG. 4 is an illustration of a "non-decorative" co-curable epoxy-based composite material according to a present aspect.

According to further aspects, the co-curable and co-cured polyurethane-based coating material layer can be useful in the formation of and protection of epoxy-based composite materials that can be coated with either decorative or non-decorative coatings. FIG. 4, shows the co-cured polyurethane-coated epoxy-based composite material 19 with a non-decorative topcoat layer 42 deposited onto or otherwise oriented on the co-cured polyurethane-coated epoxy-based composite material 19 to form a non-decorative painted assembly 40. Such non-decorative paint assemblies can be formed at, for example, on non-decorative sections of vehicles (e.g., aircraft, terrestrial vehicles, waterborne vehicle, spacecraft, or the like, etc.), on vehicles that may not require commercial differentiation, or that otherwise may not require decorative detail. Such non-decorative painted assemblies may not comprise basecoat layers, clearcoat layers, etc.

In addition, the presently disclosed co-cured polyurethane-based coatings that are co-cured onto co-curable epoxy-based composite materials are robust and can endure subsequent and repeated autoclaving that may be required during subsequent and repeated repainting or reworking protocols. That is, unlike some currently required repainting protocols, the presently described co-cured polyurethane-based coatings need not be replaced, removed or otherwise reapplied during repainting and repeated autoclaving. Accordingly, present aspects contemplate the removal or reconditioning of the layers that are coated atop the presently disclosed co-cured polyurethane-based coating material layers (e.g., topcoat layers, basecoat layers, clearcoat layers, intermediate coating layers, etc.).

At a minimum, according to present aspects, when the co-curable polyurethane-based coating is applied to the co-curable epoxy-based composite material, the presently disclosed co-cured polyurethane-based coatings adopt and perform the functions of, at least, the surfacing film layer, the spray surfacer layer applied to a surfacing film, and primer layer applied to the spray surfacer. For the purpose of the present application, the surfacing film layer, the spray surfacer layer applied to a surfacing film, and primer layer applied to the spray surfacer are collectively and equivalently referred to herein as "the obviated layers".

By eliminating the presence of and need for the obviated layers, the total coating (e.g., paint and associated paint coating layers, etc.) thicknesses on large composite material structures such as, for example, aircraft, etc., are reduced by from about 42% to about 62%. This substantial weight reduction accomplished by eliminating the presence of the obviated layers, in turn, translates into significant production and operational cost reduction over the useful life of, for example, an aircraft, in terms of decreased fuel cost, and can further contribute significantly to increased payload capacity, increased aircraft range, etc. More specifically, according to present aspects, the presently disclosed co-cured polyurethane-based film coating material layer has an average thickness ranging from about 2 mils to about 3 mils. In comparison and contrast, the total thickness of the combined obviated layers typically ranges from about 4.3 mils to about 5.8 mils. The individual obviated layers typically have the following average thicknesses: 1) a surfacing film typically has an average thickness of about 2.6 mils; 2) a spray surfacing layer typically has an average thickness ranging from about 1 to about 2 mils; and 3) a primer layer typically has an average thickness ranging from about 0.7 to about 1.2 mils. According to present aspects, the weight reduction over the area of, for example, an aircraft, that can be achieved by substituting the presently disclosed co-curable and co-cured polyurethane-based coating material layer for the obviated layers can range, for example, from about 100 lbs. to about 370 lbs of weight reduction.

In addition to enduring the harsh conditions of repeated autoclaving, such as those conditions incurred by subsequent surface painting of epoxy-based composite material substrates, the presently disclosed co-curable and co-cured polyurethane-based coating materials resist the typical degradation that coating layers incur as a result of exposure to paint stripping agents used during repainting and resurfacing protocols over the useful life of coated composite substrates. That is, typical composite material repainting protocols call for at least one or more of the obviated layers to be stripped from the coating layer "stack". For example, according to typical methods, while the obviated surfacing film layer may resist chemical paint strippers for the purpose of protecting the epoxy-based composite material, some degree of surfacing film may be stripped away from the coating stack, along with the spray surfacer layer and the primer layer. In contrast to typical operations, and according to present aspects, the co-cured and co-curable polyurethane-based coatings act as surfacing film, spray surfacer, and primer, and further display a resistance to chemical strippers, such that the presently disclosed co-cured polyurethane-based coating material layer will not be stripped from the coating stack during the resurfacing/stripping that occurs prior to repainting. The presently disclosed co-cured polyurethane-based coatings displayed a chemical resistivity in terms of pencil hardness of HB or higher after 48 hours of exposure to direct exposure of a benzyl alcohol-based paint stripping agent, with the chemical resistance measured by ASTM Method D 3363-05(2011)e2.

Chemical agents incompatible with paints or other coating materials and that can soften, or otherwise controllably destroy and find use as paint stripping agent include, for example, phosphate ester hydraulic fluids, benzyl alcohol, terpene solutions, etc. The presently disclosed co-cured polyurethane-based coating materials are formulated to possess a chemical resistance to chemical agents useful as paint stripping agents. For example, presently disclosed co-cured polyurethane-based coating materials were exposed to Bonderite S-ST 1270-6 for up to 48 hours without visible pinholes observed in the surface of the co-cured polyurethane-based coating material layer having an average thickness ranging from about 2 mils to about 3 mils.

According to further aspects, the presently disclosed co-curable polyurethane-based coating materials can further comprise tack characteristics that facilitate their application onto complex surfaces, including surfaces having complex geometries (including, for example, irregular geometries, contours, etc.), as well as facilitate the application, intermediate and/or final placement, etc. of such co-curable polyurethane-based coating materials in difficult to access regions including, for example, the underside or structures where gravitational forces could frustrate the ability to naturally "drape" a coating film over a contour, or other surface geometry, etc., without sustaining wrinkling, creasing, gapping, reverse-folding, etc.

According to present aspects, and for purposes of the present application, "tack" is understood to be a degree of adhesion adequate to maintain, or hold, a material in place, with the degree of adhesion potentially being such that the material can be removable for a plurality of times to facilitate final placement at a desired application location, for example, on a larger component or object such as, for example, a location on an aircraft or aircraft assembly or sub-assembly.

While the co-curable polyurethane-based coating material in the form of a film can be fabricated to possess a predetermined tack value, such co-curable polyurethane-based coating material films can also be treated with a tack material layer. Suitable tack material layers, can be provided to the co-curable polyurethane-based coating material film in a form as desired such as, for example, spray form, film form, etc. Non-limiting examples of tack material layers compatible with the presently disclosed co-curable polyurethane-based coating materials include, for example, pressure-sensitive adhesive materials including, for example, epoxy pressure-sensitive adhesive materials, acrylic pressure-sensitive adhesive materials, polyurethane pressure-sensitive adhesive materials, etc.

Figure 5A:
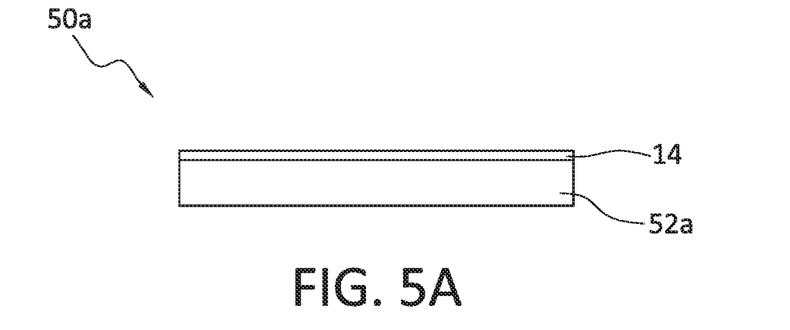
FIG. 5A is an illustration of a co-curable epoxy-based composite material incorporating a tack layer, according to a present aspect.
Figure 5B:
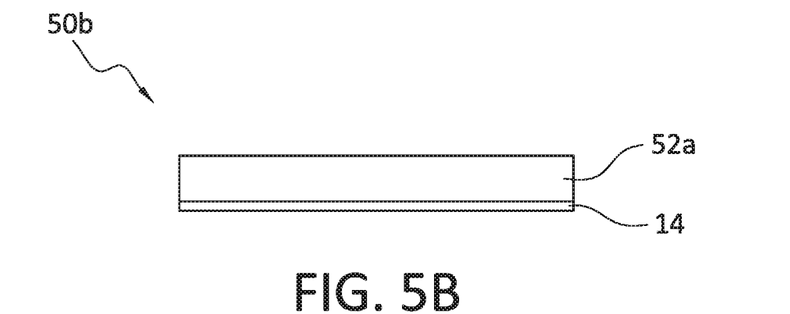
FIG. 5B is an illustration of a co-curable epoxy-based composite material incorporating a tack layer, according to a present aspect.
Figure 5C:
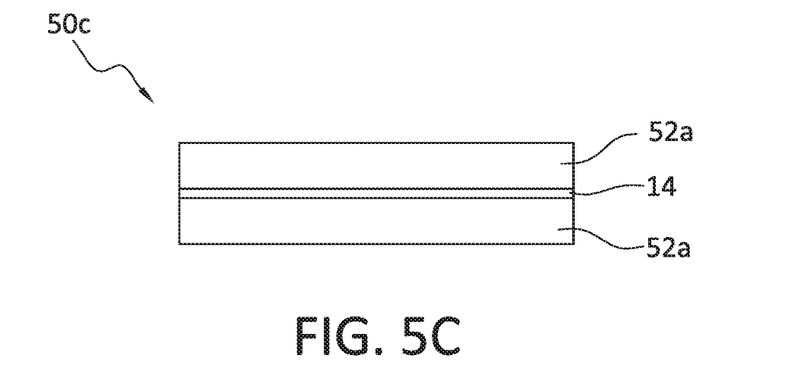
FIG. 5C is an illustration of a painted co-curable epoxy resin-containing material incorporating a tack layer, according to a present aspect.

According to further present aspects, FIGS. 5A, 5B, and 5C illustrate non-limiting examples of presently disclosed co-curable polyurethane-based films in combination with tack layers. As shown in FIG. 5A, the co-curable polyurethane-based coating material 14 is associated with and otherwise provided to or deposited onto a tack material layer 52a to form a co-curable polyurethane-based film with tack layer 50a. As shown in FIG. 5B the tack material layer 52a is associated with and otherwise provided to or deposited onto the co-curable polyurethane-based coating material 14 to form a co-curable polyurethane-based film with tack layer 50b. FIG. 5C shows another contemplated aspect, wherein the co-curable polyurethane-based coating material 14 is associated with and otherwise provided to or deposited onto a first tack material layer 52a, followed by depositing a second tack material layer 52a onto the co-curable polyurethane-based coating material 14 to form a co-curable polyurethane-based film with two tack layers 50c, and with the co-curable polyurethane-based coating material 14 interposed between the two tack layers 52a. Further aspects contemplate any desired number of tack layers disposed in contact with the co-curable polyurethane-based coating material, and in contact with one or more sides (e.g. interior side, exterior side) of one or more co-curable polyurethane-based coating material film layer or film layers.

If desired, the co-curable polyurethane-based coating material layer can comprise or otherwise associate with a scrim layer. Scrim layers are understood to be reinforcement layers that can be used in the manufacture of composite materials comprising glass fiber, carbon fiber, boron fiber, aramid fiber, etc. Scrim layers can be made from woven or non-woven materials and can include gauze-like material. According to present aspects, scrim layers can be present in the paint assembly stacks to provide an additional protective surface and/or a structure reinforcement for the composite material substrate, and can further facilitate performance of the co-cured polyurethane-based coating material layer that is co-cured with the co-cured epoxy-based composite material.

Figure 6A:
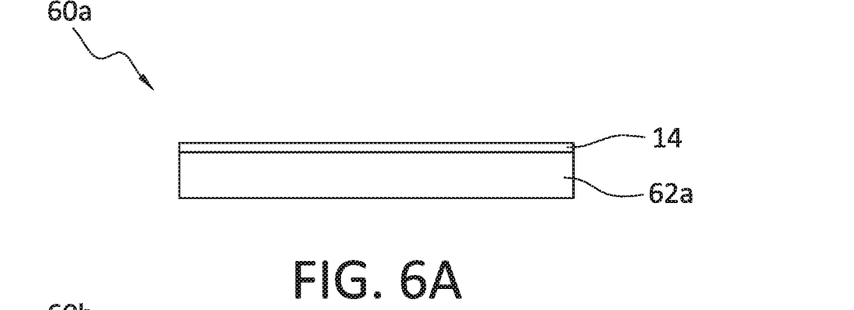
FIG. 6A is an illustration of a co-curable epoxy-based composite material incorporating a scrim, according to a present aspect.
Figure 6B:
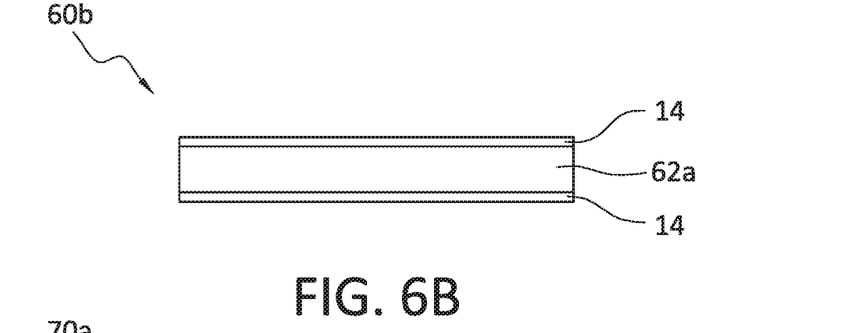
FIG. 6B is an illustration of a co-curable epoxy-based composite material incorporating a scrim, according to a present aspect.

FIGS. 6A and 6B are illustrations of further present aspects showing the presence of a scrim layer. FIG. 6A shows scrim layer 62a in combination with co-curable polyurethane-based coating material 14 to form a co-curable polyurethane-based coating material 14 with one scrim layer 60a. FIG. 6B is a non-limiting illustration showing the presence of scrim layer 62a interposed between a plurality (e.g., two) of co-curable polyurethane-based coating material layers 14 to form a co curable polyurethane-based coating material with a scrim layers 60b. Further aspects contemplate any desired number of scrim layers disposed in contact with the co-curable polyurethane-based coating material, and in contact with one or more sides of one or more co-curable polyurethane-based coating material film layer or film layers.

Figure 7A:
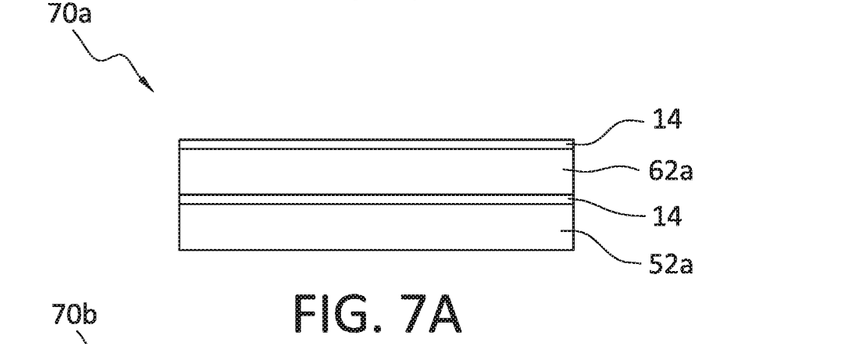
FIG. 7A is an illustration of a co-curable epoxy-based composite material incorporating a tack layer and a scrim, according to a present aspect.
Figure 7B:
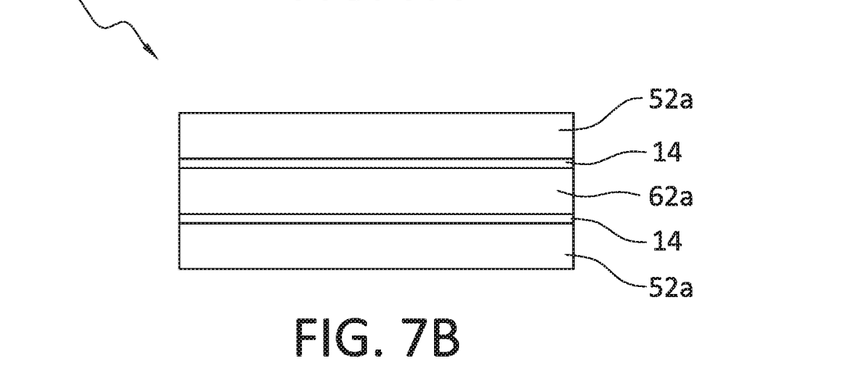
FIG. 7B is an illustration of a co-curable epoxy-based composite material incorporating a tack layer and a scrim, according to a present aspect.

Further aspects contemplate the incorporation of both scrim layers and tack layers with the co curable polyurethane-based coating material layer. FIGS. 7A and 7B are non-limiting illustrations showing the presently disclosed co-curable polyurethane-based coating material layers 14 combined with scrim layer 62a and tack layer(s) 52a. As shown in FIG. 7A, a first co-curable polyurethane-based coating material layer 14, that can be a film layer, is associated with and otherwise provided to or deposited onto a tack material layer 52a, with scrim material layer 62a then disposed onto a first co-curable polyurethane-based coating material layer 14. A second co-curable polyurethane-based coating material layer 14, that can be a film layer, is shown disposed onto scrim material layer 62a, such that the scrim material layer 62a is interposed between first and second layers of the co-curable polyurethane-based coating material layer 14 to form a co-curable polyurethane-based film stack including a scrim layer and a tack layer 70a.

As shown in FIG. 7B, the co-curable polyurethane-based coating material stack 70a as shown FIG. 7A further includes a second tack layer 52a disposed onto the second co-curable polyurethane-based coating material to form a co-curable polyurethane-based film stack having a scrim layer and two tack layers 70b, such that tack material layers "bound" both co-curable polyurethane-based coating layers 14. Further aspects contemplate any desired number of scrim material layers and/or tack material layers disposed in contact with the co-curable polyurethane-based coating material layer or layers, and in contact with one or more sides (e.g., interior side, exterior side) of one or more co-curable polyurethane-based coating material film layer or film layers.

The co-curable and co-cured polyurethane-based coating material layer and the co-curable and co-cured epoxy-based composite material coated with the co-curable and co-cured polyurethane-based coating material layer can be used in the manufacture of components (e.g., including composite components), assemblies, sub-assemblies, etc., and in larger objects including stationary objects and or vehicle incorporating the components, assemblies, sub-assemblies, etc. Larger stationary objects include, for example, buildings, bridges, trusses, etc. Larger vehicles include, for example, manned and unmanned aircraft, manned and unmanned spacecraft, manned and unmanned rotorcraft, manned and unmanned hovercraft, manned and unmanned terrestrial vehicles, manned and unmanned waterborne surface vehicles, manned and unmanned waterborne sub-surface vehicles, manned and unmanned satellites, or the like, and combinations thereof.

Figure 8:
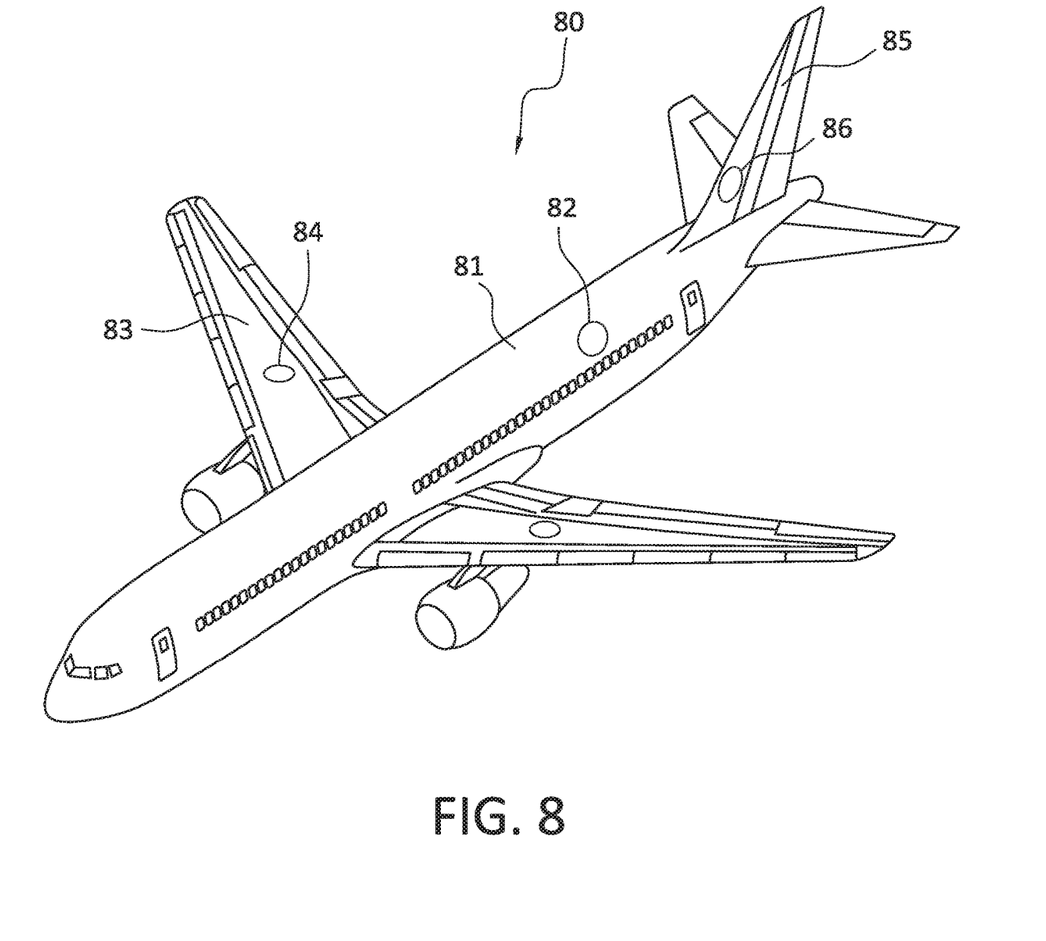
FIG. 8 is an illustration of an aircraft incorporating a co-cured epoxy-based composite material according to present aspects.

FIG. 8 is a non-limiting illustration of a vehicle 80, in the form of an aircraft. As shown in FIG. 8, the vehicle 80 includes surfaces, and surface assemblies and sub-assemblies than can incorporate co-curable and co-cured epoxy-based composite materials that can be coated with the presently disclosed co-curable and co-cured polyurethane-based coating material layer. As shown in FIG. 8, vehicle 80 includes a fuselage 81 including a fuselage section 82; a wing 83 including wing section 84; and tail/vertical stabilizer 85 including tail/vertical stabilizer section 86. The co-curable and co-cured polyurethane-based coating materials and the co-curable and co-cured epoxy-based composite materials coated with the co-curable and co-cured polyurethane-based coating material layer can be used in the manufacture of the components, assemblies, sub-assemblies, etc., at least including those shown in FIG. 8.

Figure 9:
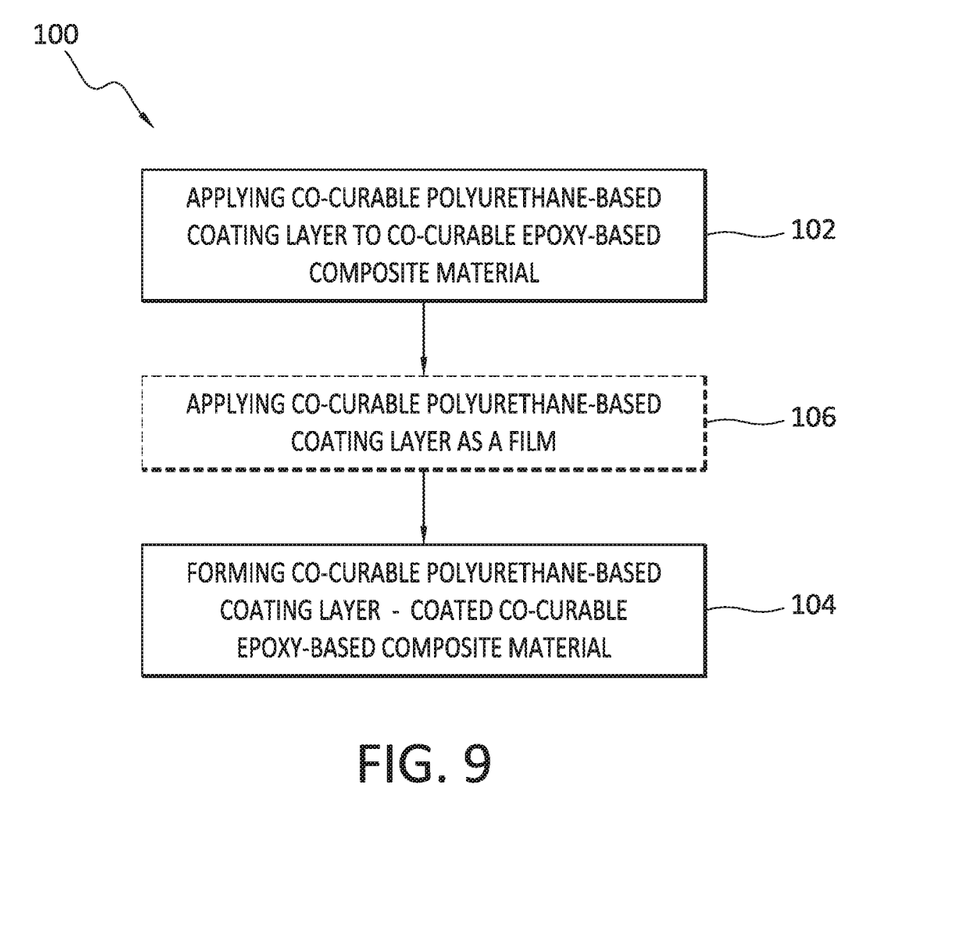
FIG. 9 is a flowchart outlining a method according to a present aspect.
Figure 10:
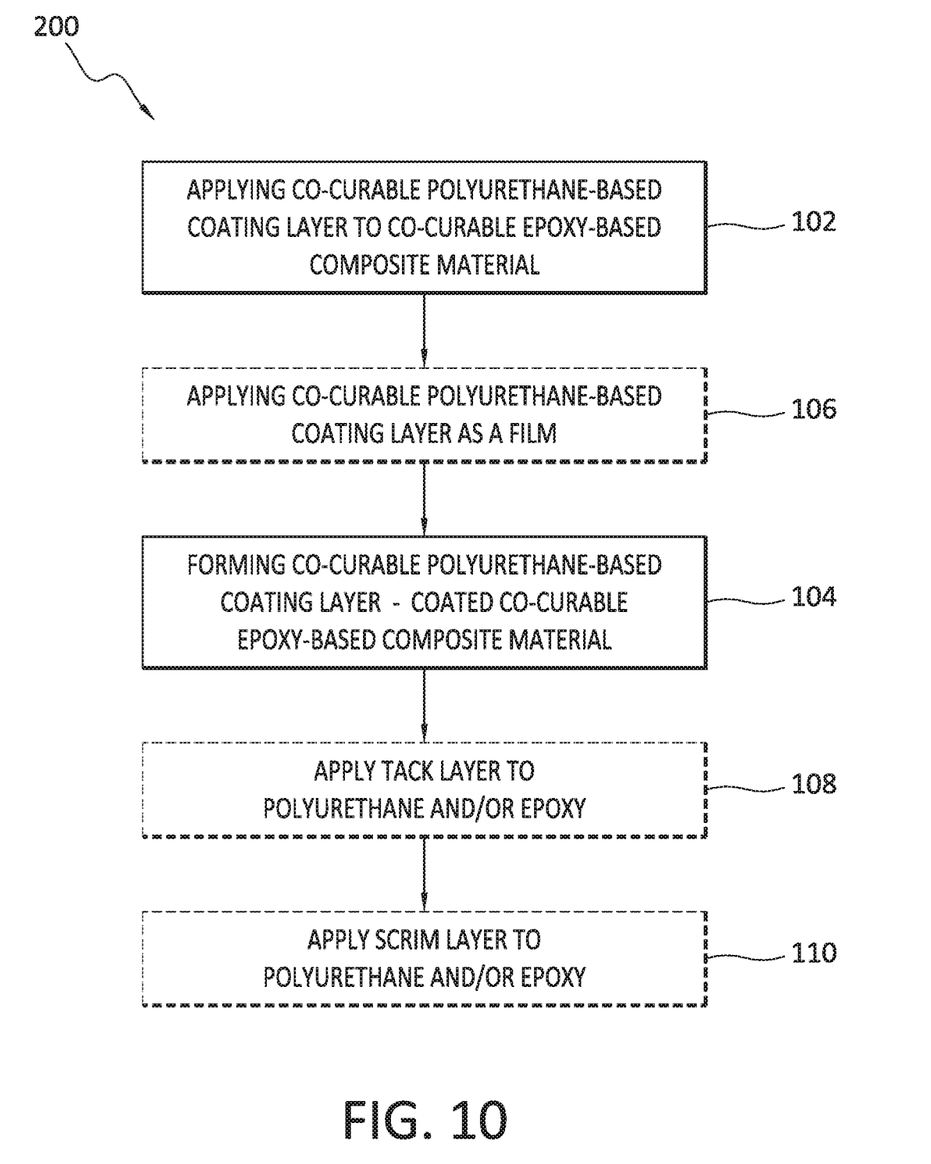
FIG. 10 is a flowchart outlining a method according to a present aspect.
Figure 11:
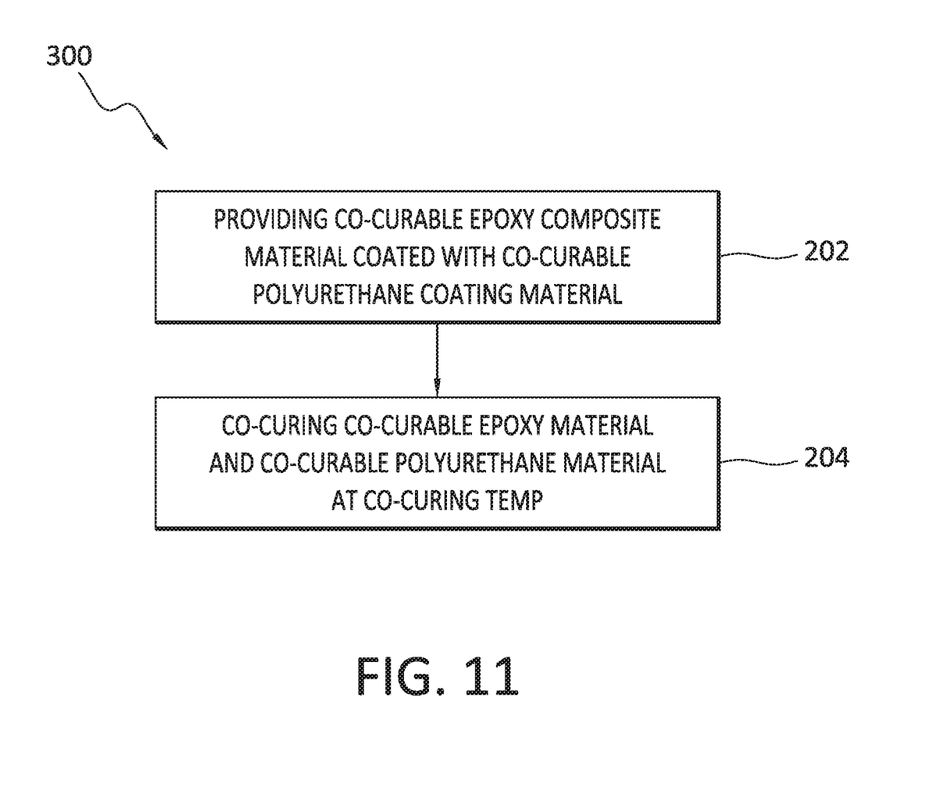
FIG. 11 is a flowchart outlining a method according to a present aspect.

FIGS. 9, 10, and 11 are non-limiting flowcharts outlining methods according to present aspects. FIG. 9 outlines a non-limiting illustrative method 100 including applying 102 a co-curable polyurethane-based coating material layer to a co-curable epoxy-based composite material. The co-curable polyurethane-based coating material layer includes a UV stabilizer and a curing agent, and the coating material has a UV resistance to wavelengths ranging from about 200 nm to about 800 nm. The method 100 further includes forming 104 a co-curable polyurethane-coated epoxy-based composite material, and optionally including applying 106 the co-curable polyurethane-based coating material layer as a film that can be a single layer film.

FIG. 10 outlines a non-limiting illustrative method 200 including applying 102 a co-curable polyurethane-based coating material layer to a co-curable epoxy-based composite material. The co-curable polyurethane-based coating material layer includes a UV stabilizer and a curing agent, and the coating material has a UV resistance to wavelengths ranging from about 200 nm to about 800 nm. The method 100 further includes forming 104 a co-curable polyurethane-coated epoxy-based composite material, and optionally including applying 106 the co-curable polyurethane-based coating material layer as a film that can be a single layer film, and optionally applying 106 at least one tack layer to the co-curable polyurethane-based coating material, and optionally applying 108 at least one tack material layer to at least one of: the polyurethane-based coating material, and the epoxy-based composite material, and optionally applying 110 at least one layer of scrim material to at least one of: the polyurethane-based coating material, and the epoxy-based composite material.

FIG. 11 outlines a non-limiting illustrative method 300 including providing 202 a coated co-curable epoxy-based composite material coated with a co-curable polyurethane-based coating material layer, with the co-curable polyurethane-based coating material including a UV stabilizer material, and with the co-curable polyurethane-based coating material layer having a UV resistance to wavelengths ranging from about 200 nm to about 800 nm. The method further comprises co-curing 204 the coated co-curable epoxy-based composite material coated with a co-curable polyurethane-based coating material at a curing temperature, with the curing temperature ranging from about 250° F. to about 370° F., to form a co-cured polyurethane-coated epoxy-based composite material, and wherein the curing temperature does not exceed 400° F. According to present aspects, the method 300 outlined in FIG. 11 can employ the co-curable epoxy-based composite material coated with the co-curable and co-cured polyurethane-based coating material as shown in FIG. 9 and/or FIG. 10.

In a further aspect, at least in the presently disclosed methods outlined in FIGS. 9, 10, and/or 11, the co-curable epoxy-based composite material coated with the polyurethane-based coating material does not include an intervening surfacing film layer between the co-curable or co-cured polyurethane-based coating material and the co-curable or co-cured epoxy-based composite material.

In another aspect, at least in the presently disclosed methods outlined in FIGS. 9, 10, and/or 11, the co-curable epoxy-based composite material coated with the polyurethane-based coating material does not include an intervening primer layer between the co-curable or co-cured polyurethane-based coating material and the co-curable or co-cured epoxy-based composite material.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. A co-curable epoxy-based composite material comprising:
   at least one layer of a co-curable polyurethane-based coating material, said co-curable polyurethane-based coating material configured to be disposed directly onto the co-curable epoxy-based composite material to form co-curable epoxy-based composite material coated with a co-curable polyurethane-based coating material layer, said co-curable polyurethane-based coating material layer comprising:
      an amount of a UV-stabilizer agent; and
      an amount of a curing control agent;
   wherein the co-curable polyurethane-based coating material layer at a thickness ranging from about 2 mils to about 3 mils comprises a UV transmittance value of 0% over a UV wavelength range of from about 200 nm to about 800 nm and comprises a Tg ranging from about 50° F. to about 250° F.

2. The co-curable epoxy-based composite material of claim 1, wherein the UV-stabilizer agent and the curing control agent are incorporated into the co-curable polyurethane-based coating material layer.

3. The co-curable epoxy-based composite material of claim 1, wherein the co-curable epoxy-based composite material comprises at least one of: a carbon fiber-reinforced epoxy material, a glass-fiber reinforced epoxy material, a boron fiber-reinforced epoxy material; an aramid fiber-reinforced material; and combinations thereof.

4. The co-curable epoxy-based composite material of claim 1, wherein the co-curable epoxy-based composite material is configured to co-cure with the co-curable polyurethane-based coating material layer at a temperature ranging from about 250° F. to about 370° F.

5. The co-curable epoxy-based composite material of claim 1, further comprising:
   at least one tack layer configured to be in contact with the co-curable polyurethane-based coating material layer.

6. The co-curable epoxy-based composite material of claim 1, further comprising:
   at least one scrim layer disposed onto the co-curable polyurethane-based coating material layer.

7. The co-curable epoxy-based composite material of claim 1, further comprising:
   at least one scrim layer disposed onto the co-curable polyurethane-based coating material layer; and
   at least one tack layer configured to be in contact with the co-curable polyurethane-based coating material layer.

8. The co-curable epoxy-based composite material of claim 1:
   wherein the co-curable epoxy-based composite material does not comprise an intervening surfacing layer between the co-curable polyurethane-based coating material layer and the co-curable epoxy-based coating material; and
   wherein the co-curable epoxy-based composite material does not comprise an intervening primer layer between the co-curable polyurethane-based coating material layer and the co-curable epoxy-based composite material.

9. The co-curable epoxy-based composite material of claim 1, wherein the co-curable polyurethane-based coating material layer is applied as a film to the co-curable epoxy-based composite material.

10. A composite component comprising the co-curable epoxy-based composite material of claim 1.

11. A co-cured polyurethane-coated epoxy-based composite material comprising:
    a co-cured polyurethane-based coating material; and
    a co-cured epoxy-based composite material, to form a co-cured polyurethane-coated epoxy-based composite material, said co-curable polyurethane-based coating material layer comprising an amount of a UV stabilizer agent;
    wherein the co-cured polyurethane-based coating material layer comprises a UV transmittance value of 0% when the co-cured polyurethane-based coating material layer comprises an average thickness ranging from about 2 mils to about 3 mils.

12. The co-cured epoxy-based composite material of claim 11, wherein the co-curable epoxy-based composite material does not comprise an intervening surfacing layer between the co-cured polyurethane-based coating material layer and the co-cured epoxy-based coating material; and
    wherein the co-cured epoxy-based composite material does not comprise an intervening primer layer between the co-cured polyurethane-based coating material layer and the co-cured epoxy-based composite material.

13. The co-cured epoxy-based composite material of claim 11, wherein the co-cured polyurethane-based coating material layer has an electrical resistance value greater than 1000 kΩ.

14. A composite component comprising the co-cured epoxy-based composite material of claim 11.

15. A vehicle comprising the composite component of claim 14, said vehicle selected from the group consisting of:
    a manned aircraft, an unmanned aircraft, a manned spacecraft, an unmanned spacecraft, a manned rotorcraft, an unmanned rotorcraft, a manned terrestrial vehicle, an unmanned terrestrial vehicle; a manned surface water borne vehicle, an unmanned waterborne vehicle, a manned sub-surface water borne vehicle, a satellite, and combinations thereof.

16. A method comprising:
    applying a co-curable polyurethane-based coating layer directly to a co-curable epoxy-based composite material;
    forming a co-curable polyurethane-coated epoxy-based composite material, said co-curable polyurethane-based coating layer comprising:
       a UV-stabilizer agent; and
       a curing control agent;
    wherein the co-curable polyurethane-based coating material layer at a thickness ranging from about 2 mils to about 3 mils comprises a UV transmittance value of 0% over a UV wavelength range of from about 200 nm to about 800 nm and comprises a Tg ranging from about 50° F. to about 250° F.

17. The method of claim 16, wherein in the step of applying the polyurethane-based coating material layer to the co-curable epoxy-based composite material, further comprising:
    applying the co-curable polyurethane-based coating material layer as a film.

18. The method of claim 16, further comprising;
    applying at least one tack material layer onto at least one of:
       the co-curable polyurethane-based coating material layer and the co-curable epoxy-based composite material.

19. The method of claim 16, further comprising:
applying at least one scrim layer onto at least one of: the co-curable polyurethane-based coating material layer and the co-curable epoxy-based composite material.

20. A method of forming a co-cured epoxy-based composite material comprising:
providing a co-curable epoxy-based composite material coated with a co-curable polyurethane-based coating material layer, said co-curable polyurethane-based coating material layer comprising:
a UV-inhibiting agent;
a curing control agent; and
co-curing the co-curable polyurethane-based coating material layer and the co-curable epoxy-based composite material at a co-curing temperature ranging from about 250° F. to about 370° F. to form a co-cured polyurethane-coated epoxy-based composite material;
wherein the co-curable polyurethane-based coating material layer at a thickness ranging from about 2 mils to about 3 mils comprises a UV transmittance value of 0% over a UV wavelength range of from about 200 nm to about 800 nm and comprises a Tg ranging from about 50° F. to about 250° F.

* * * * *